United States Patent
Becker et al.

(10) Patent No.: US 6,650,690 B2
(45) Date of Patent: Nov. 18, 2003

(54) DEVICE AND SYSTEM FOR CARRYING OUT SEARCH PROCEDURES IN A MOBILE RADIO RECEIVER

(75) Inventors: Burkhard Becker, Ismaning (DE); Markus Dötsch, Schliern (CH); Peter Jung, Otterberg (DE); Tideya Kella, München (DE); Jörg Plechinger, München (DE); Sven Simon, Bremen (DE); Michael Schneider, München (DE); Peter Schmidt, Ellerstadt (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/213,417

(22) Filed: Aug. 5, 2002

(65) Prior Publication Data

US 2003/0021366 A1 Jan. 30, 2003

Related U.S. Application Data (63) Continuation of application No. PCT/DE01/00440, filed on Feb. 2, 2001.

(30) Foreign Application Priority Data

Feb. 4, 2000 (DE) .......................... 100 04 874

(51) Int. Cl.⁷ .................. H04B 15/00; H04K 1/00; H04L 27/30
(52) U.S. Cl. ............... 375/142; 375/150; 375/343; 708/422
(58) Field of Search .............. 375/130, 140, 375/142, 141, 147, 150, 152, 343; 708/422, 426

(56) References Cited

U.S. PATENT DOCUMENTS

| | | | |
|---|---|---|---|
| 5,974,087 A | | 10/1999 | Nowara |
| 6,038,271 A | * | 3/2000 | Olaker et al. ............... 375/343 |
| 6,438,182 B1 | * | 8/2002 | Olaker et al. ............... 375/343 |
| 6,493,405 B1 | * | 12/2002 | Olaker et al. ............... 375/343 |

FOREIGN PATENT DOCUMENTS

| | | |
|---|---|---|
| DE | 30 32 296 B1 | 6/1981 |
| DE | 31 39 408 C2 | 4/1983 |
| DE | 36 27 135 C2 | 2/1988 |
| DE | 41 07 640 A1 | 9/1992 |
| DE | 42 26 952 A1 | 2/1994 |
| DE | 195 23 327 A1 | 1/1997 |
| DE | 197 47 367 A1 | 5/1999 |
| DE | 197 49 665 A1 | 5/1999 |
| DE | 100 04 874 C2 | 8/2001 |
| EP | 0 820 156 A2 | 1/1998 |
| WO | WO 98/02973 | 1/1998 |

* cited by examiner

Primary Examiner—Jean B. Corrielus
(74) Attorney, Agent, or Firm—Laurence A. Greenberg; Werner H. Stemer; Ralph E. Locher (57) ABSTRACT

A device for carrying out search procedures includes a memory for storing a digital received data sequence, and a memory storing a predetermined correlation data sequence. A correlation device has a first section, in which sequence elements of the received data sequence are correlated with sequence elements of the correlation data sequence. A variable number K of sequence element correlation results are summed in the second section, in order to form an accumulated correlation result.

13 Claims, 7 Drawing Sheets

DEVICE AND SYSTEM FOR CARRYING OUT SEARCH PROCEDURES IN A MOBILE RADIO RECEIVER

CROSS-REFERENCE TO RELATED APPLICATION

This application is a continuation of copending International Application No. PCT/DE01/00440, filed Feb. 2, 2001, which designated the United States and was not published in English.

BACKGROUND OF THE INVENTION

FIELD OF THE INVENTION

The invention relates to a device and a system for carrying out search procedures in a mobile radio receiver.

In order to produce and maintain a radio connection between a mobile radio receiver (mobile station) and a transmitter (base station), the mobile radio receiver must be synchronized to the transmitting base station. In addition to frequency synchronization, which is not considered any further in the following text, frame and time slot synchronization of the receiver must also be carried out with a frame and time slot structure of the received radio signal, as predetermined by the transmitter.

For frame and time slot synchronization, the base station transmits specific, standardized data sequences. These data sequences are detected in the mobile station by carrying out suitable search procedures. The frame and time slot synchronization of the mobile station is then carried out based on the detection times of the data sequences.

Radio signals in cellular mobile radio systems are subject to multipath propagation. This means that a radio signal that is transmitted from the base station reaches the mobile station as a multi-component signal with different delay times relating to the individual signal paths. A delay estimation is required in order to determine the different signal delay times of the signal components. Likewise, the delay estimation for the individual signal components can be carried out by a search procedure in the mobile station.

Devices for carrying out such search procedures are referred to in mobile radio technology as "searchers" (search circuits). It is already known for search circuits to be provided in the form of filters that are matched to the signal (matched filters). The large area required and current drawn by a circuit such as this, as well as its lack of flexibility in terms of possible variations of the search procedure, are disadvantageous.

SUMMARY OF THE INVENTION

It is accordingly an object of the invention to provide a device and a system for carrying out search procedures in a mobile radio receiver that overcome the hereinafore-mentioned disadvantages of the heretofore-known devices of this general type and whose circuitry construction is simple (so that it thus also occupies a small area and draws little current) while, at the same time, has high flexibility for carrying out different search procedures.

With the foregoing and other objects in view, there is provided, in accordance with the invention, a device for carrying out search procedures in a mobile radio receiver. The device includes a random access memory, a read only memory, and a correlation device. The random access memory is for storing a digital received data sequence including individual sequence elements of predetermined length N obtained from a received radio signal. The read only memory stores a predetermined, digital correlation data sequence including sequence elements each having a respective length. The correlation device has two sections for correlating the digital received data sequence with the predetermined, digital correlation data sequence. A first of the two sections correlates the individual sequence elements of predetermined length N in the received data sequence with the individual sequence elements of the same length in the correlation data sequence during parallel data processing in each case, and produces a sequence element correlation result for each correlation. A second of the two sections sums a variable number K of the sequence element correlation results to form an accumulated correlation result during serial data processing.

With the objects of the invention in view, there is also provided a system including two devices as described in the previous paragraph and a fourth section shared by both devices. The common fourth section is in the form of an adder for adding the accumulated correlation results calculated in the second sections of the first and second devices.

One major aspect of the invention is that the correlator device is formed from two components (first section and second section), with the first section having a parallel structure and the second section having a serial structure. The first section is used to produce sequence element correlation results relating to the sequence elements quickly and with little effort, using parallel data processing. These sequence element correlation results can be interpreted as "intermediate results" of the overall correlation task. In the second, serial section, a variable number K of sequence element correlation results (that is to say intermediate results) are used for calculating the accumulated correlation result. The capability to vary the number K allows the device to be used for carrying out quite different search procedures (in particular for frame and time slot synchronization and for delay time estimation), and it is possible to use correlation data sequences with different lengths, and to take account of different accuracy requirements with regard to the accumulated correlation result. Furthermore, the design concept according to the invention also makes it possible to provide a search circuit that is extremely advantageous in terms of the area required and the current drawn.

The first section preferably contains a number of memory banks (specifically P), each having N memory cells, where P is the oversampling factor that is used to obtain the received data sequence from the received radio signal. Thus, in the case of double oversampling, the first section contains two memory banks. This design allows the alternating storage of the sample values in the two memory banks, and thus allows the calculation of the sequence element correlation results with regard to "earlier" and "later" sample values of the elements of the digital received data sequence by appropriate selection of the first or of the second memory bank, respectively.

The correlation of the sequence elements (of length N) of the digital received data sequence with corresponding sequence elements of the same length in the correlation data sequence is preferably carried out by a multiplication data processing stage, which is provided in the first section and includes N multipliers connected in parallel.

One preferred refinement of the invention is distinguished in that the number K of sequence element correlation results that can be added up in the second section is varied by a control device as a function of the search procedure to be carried out, and/or as a function of the length of the digital received data sequence, and/or as a function of the desired calculation accuracy with regard to the accumulated correlation result.

The device according to the invention can be disposed in the quadrature (Q) branch or in the in-phase (I) branch of the mobile radio receiver. One preferred embodiment of the invention is formed by a system which has two devices according to the invention, in each case one for the Q branch and the other for the I branch of the received radio signal, and which furthermore contains an adder for addition of the accumulated correlation results (which may subsequently also be squared) produced by the two devices. In this way, the accuracy of the correlation result calculated by the system can be increased further (in comparison to the accuracies of the correlation results for the I and Q branches calculated independently of one another).

In the system according to the invention, the "third section" is equivalent to the "third section" of the device. Likewise, in the system, the "fourth section" is equivalent to the "third section" of the device.

Further advantageous refinements of the device according to the invention are specified in the dependent claims.

Other features which are considered as characteristic for the invention are set forth in the appended claims.

Although the invention is illustrated and described herein as embodied in a device and a system for carrying out search procedures in a mobile radio receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
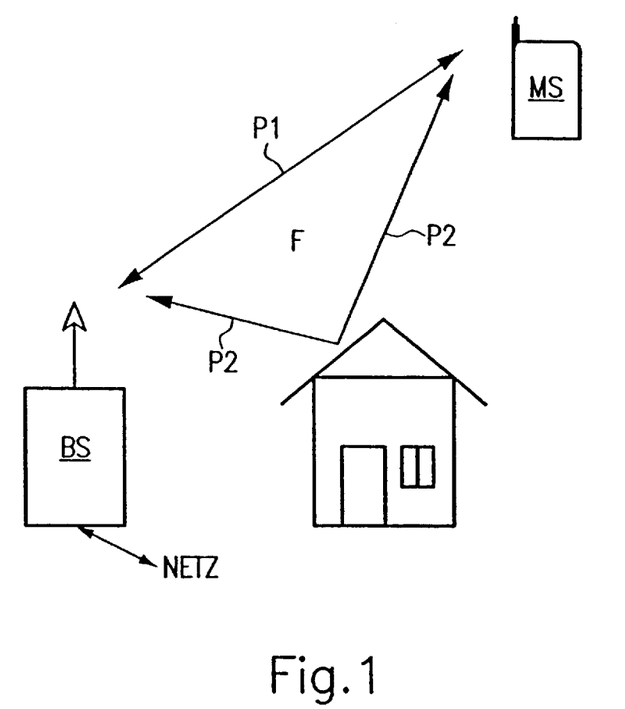
FIG. 1 is a schematic illustration showing an air interface of a mobile radio system, with a mobile station and a base station.

Referring now to the figures of the drawings in detail and first, particularly to FIG. 1 thereof, there is shown the air interface of a cellular mobile radio system. A mobile station MS associated with a specific subscriber is connected by radio to a base station BS. The radio connection is subject to multipath propagation both in the uplink direction (from the MS to the BS) and in the downlink direction (from the BS to the MS), that is to say a radio signal F that is transmitted from the base station BS can reach the mobile station MS (receiver) on different transmission routes or paths P1, P2 of the air interface. Owing to reflection, scatter and diffraction, the individual paths P1, P2 have different transmission behaviors and different radio signal delay times. This means that versions of the received radio signal are received at different times to one another in the mobile station MS.

Figure 2A:
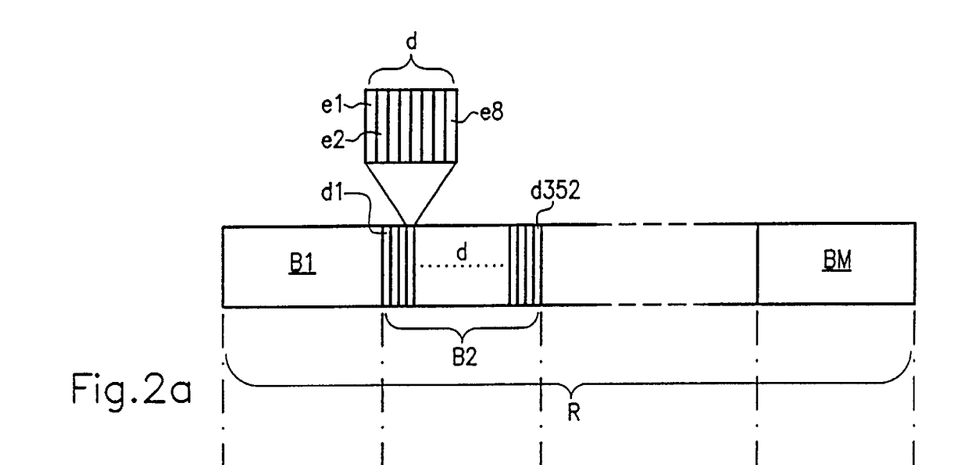
FIG. 2a is a schematic illustration showing the data structure of a radio user signal that is used in the mobile radio system.

FIG. 2a shows an example of the subdivision of a user signal component of the radio signal F into a frame structure and time slot structure.

The user signal includes a sequence of individual data symbols (bits) d. One data block B1; B2; . . . ; BM is formed from a number of data symbols d (in this case, by way of example, 352 data symbols), with this number of data symbols d is specific to the system standard. Back data block B1, B2; . . . ; BM is transmitted within one time slot (that is to say the subdivision of the data into data blocks corresponds to the subdivision of the time into time slots).

A frame R is formed from a number M of data blocks B1, B2, BM, with this number M being specific to the system standard. By way of example, one frame R may include M=15 data blocks B1, B2, . . . , B15.

If the radio signal F is a CDMA (code division multiple access) radio signal, each data symbol d is, as illustrated, spread-coded using a subscriber-specific spread code (CDMA code). The spread code has, by way of example, 8 chips $e1, e2, \ldots, e8$ per data symbol d. The entire frame/block/data symbol/chip layout as illustrated on the basis of the user signal in FIG. 2a for a radio signal F, as well as the corresponding frame/time slot/data symbol/chip time durations are predetermined on a system-specific basis, and are identical for the radio signals F transmitted by all the base stations BS.

When a call is accepted or handed over, frame and time slot synchronization must be carried out between the mobile station MS and the active base station BS, that is to say the mobile station MS must be able to identify the start and the end of a received frame R, and the start and the end of a received data block B1; B2; . . . ; BM.

A synchronization channel SK (see FIG. 2b), which is shared by all the base stations, is used to achieve frame and time slot synchronicity. The synchronization channel SK is subdivided into two channels SK1 and SK2.

Figure 2B:
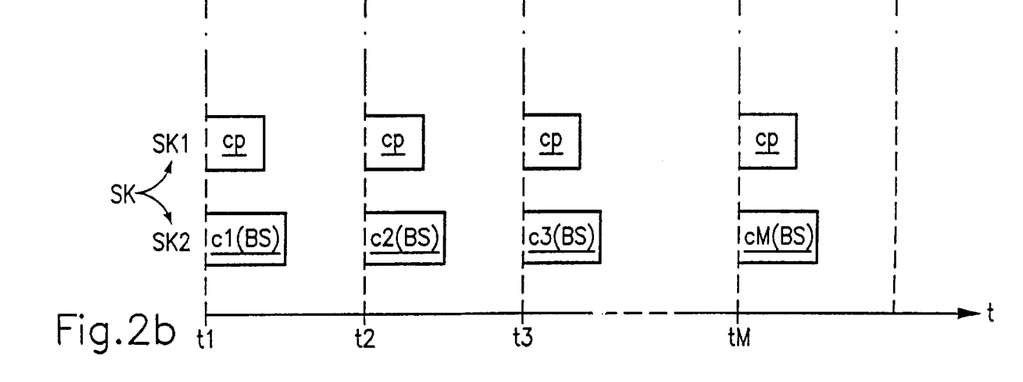
FIG. 2b is a schematic illustration showing a synchronization channel, in which the arrival of time slot synchronization codes and the arrival of frame synchronization codes of a radio signal from a base station at the location of a mobile station that is to be synchronized are plotted against the time t.

The first channel SK1 allows time slot synchronization. The base station BS uses this channel SK1 to transmit a first synchronization code (time slot synchronization code) cp at the start of each time slot. The first synchronization code cp is identical for all the time slots. The transmitted synchronization codes cp are used to provide the mobile stations MS with a clock standard, which makes it possible for them to identify the start times $t1, t2, \ldots, tM$ of the time slots.

Because the first synchronization code cp is, as has already been mentioned, identical for each time slot, this does not make it possible to determine the start of a frame R.

The second channel SK2 is used to identify the frame starts (frame synchronization). Every base station BS uses this second channel SK2 to transmit a sequence FBS=(c1(BS), c2(BS), . . . , cM(BS)), which recurs identically in each frame and includes M frame synchronization codes c1(BS); c2(BS); . . . ; cM(BS).

The M frame synchronization codes c1(BS); c2(BS); ...; cM(BS) and their sequence in the sequence FBS, which recurs in every frame R, are known by the mobile station MS. They thus make it possible to determine that time slot start time t1 that forms the frame start.

Figure 3:
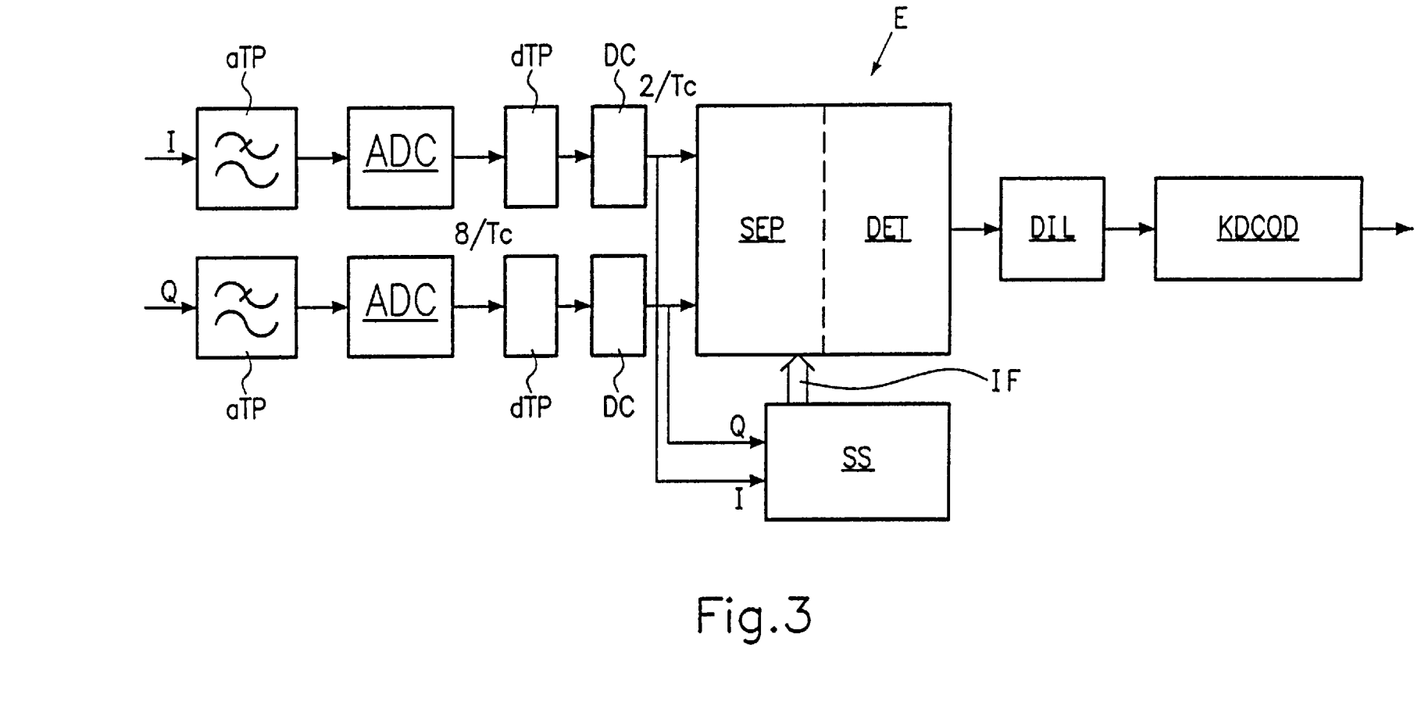
FIG. 3 is a block diagram showing a baseband section of a radio receiver.

FIG. 3 shows a block diagram of a baseband section of a receiving circuit in the mobile station MS.

An analog in-phase (I) signal component and a quadrature (Q) signal component of a received data signal are produced at the input of the baseband section. The analog I and Q signal components are produced in a manner that is not illustrated by down-mixing a received analog antenna signal at carrier frequencies that are identical frequencies and that are shifted through 90° with respect to one another in phase.

The analog I and Q signal components each pass through an analog low-pass filter aTP and are then digitized in analog/digital converters ADC. The digitization can be carried out at 8 times the chip rate, that is to say I and Q data signals at a signal rate $8/T_c$ are available at the output of the analog/digital converters, where $T_c$ is the chip time duration.

The digital I and Q data signals that are emitted from the analog/digital converters ADC are passed to digital low-pass filters dTP. The digital low-pass filters dTP may, for example, be RRC (root raised cosine) low-pass filters.

Signal rate reducing stages DC, which reduce the signal rate in the I and Q branches to $2/T_c$ in each case, are disposed in the signal path downstream from the digital low-pass filters dTP.

The digital data signals at the reduced signal rate are passed to a receiver section E in the mobile radio receiver. The receiver section E includes a subscriber signal separation section SEP and a detector section DET.

The mutually superimposed signals from different subscribers are separated in the subscriber signal separation section SEP. The subscriber separation is carried out as a function of the multiple access method that is used, for example by using spread decoding in the case of CDMA. It may be carried out in the form of single subscriber detection with correlators, matched filters or RAKE receivers, or as multiple subscriber detection.

Once the subscriber signal separation has been carried out, data detection is carried out in the detector section DET. The detector section DET for this purpose has a channel estimator and an adaptive, coherent data detector, in a manner that is known per se but is not described in any more detail. The channel estimator continuously determines the channel impulse responses (which vary continuously with time), that is to say it estimates the time-variant transmission characteristic of the mobile radio channel. The channel impulse responses are passed to the data detector, which thus calculates reconstructions of the transmitted data symbols d, taking account of the current state of the mobile radio channel (that is to say adaptively).

The reconstructive data symbols are, finally, deinterleaved in a deinterleaver DIL, are channel-decoded in a channel decoder KDCOD, and are then further processed in the normal manner (source decoding, digital/analog conversion, amplification) in order to be emitted to an output unit (for example a loudspeaker).

A device according to the invention for carrying out search procedures, referred to as a search circuit SS in the following text, has two inputs at which it receives the I and Q received data signals at the reduced signal rate. The task of the search circuit SS is to calculate information and to make this information available to the subscriber signal separation section SEP, on the basis of which frame and/or time slot synchronization are/is possible, and/or different signal path delay times can be taken into account.

The hardware complexity of the search circuit SS will be explained in more detail with reference to FIG. 4.

The search circuit SS contains a command data memory ROM2, in which instructions for carrying out various search procedures T1, T2, T3 are stored. By way of example, T1 may be a time slot start search procedure, T2 may be a frame start search procedure, and T3 may be a path delay time search procedure.

Digital received data values (decimator I or Q branch) that have been obtained from the received radio signal are stored in an input data memory RAM1, which is in the form of a random access memory. A read only memory ROM1, which is referred to as a correlation data memory, contains correlation data sequences, inter alia the already mentioned time slot and frame synchronization codes cp, c1(BS), c2(BS), ..., cM(BS). A result data memory RAM2 is used for storage of information IF, for example of (overall) correlation results, which make it possible to carry out the synchronization tasks that have been mentioned, and to take account of the path delay time.

A controller device C has a memory for a command word BS, a correlator circuit controller C_KS and a memory controller C_SP. The memory controller C_SP contains address generators AG1, AG2, and AG3, respectively, as well as start value setting devices SW1, SW2 and SW3, respectively, for driving the address sections ADR of the memories RAM1, ROM1, and RAM2.

A correlator circuit KS is controlled by the correlator circuit controller C_KS via a control data input SE. The correlator circuit KS is connected downstream from a peak value detector SD. The correlator circuit KS is connected via a received data input EE to the input data memory RAM1, and via a correlation data input KE to the correlation data memory ROM1. Furthermore, data may be interchanged in both directions with the result data memory RAM2 via an output/input AE1 of the correlator circuit KS and via an output/input AE2 of the peak value detector SD.

The input data memory RAM1 is loaded with a digital received data sequence, which originates from the I branch or Q branch. The information IF (see FIG. 3) to be calculated for the respective search procedure T1/T2/T3, is taken from the result data memory RAM2.

Figure 4:
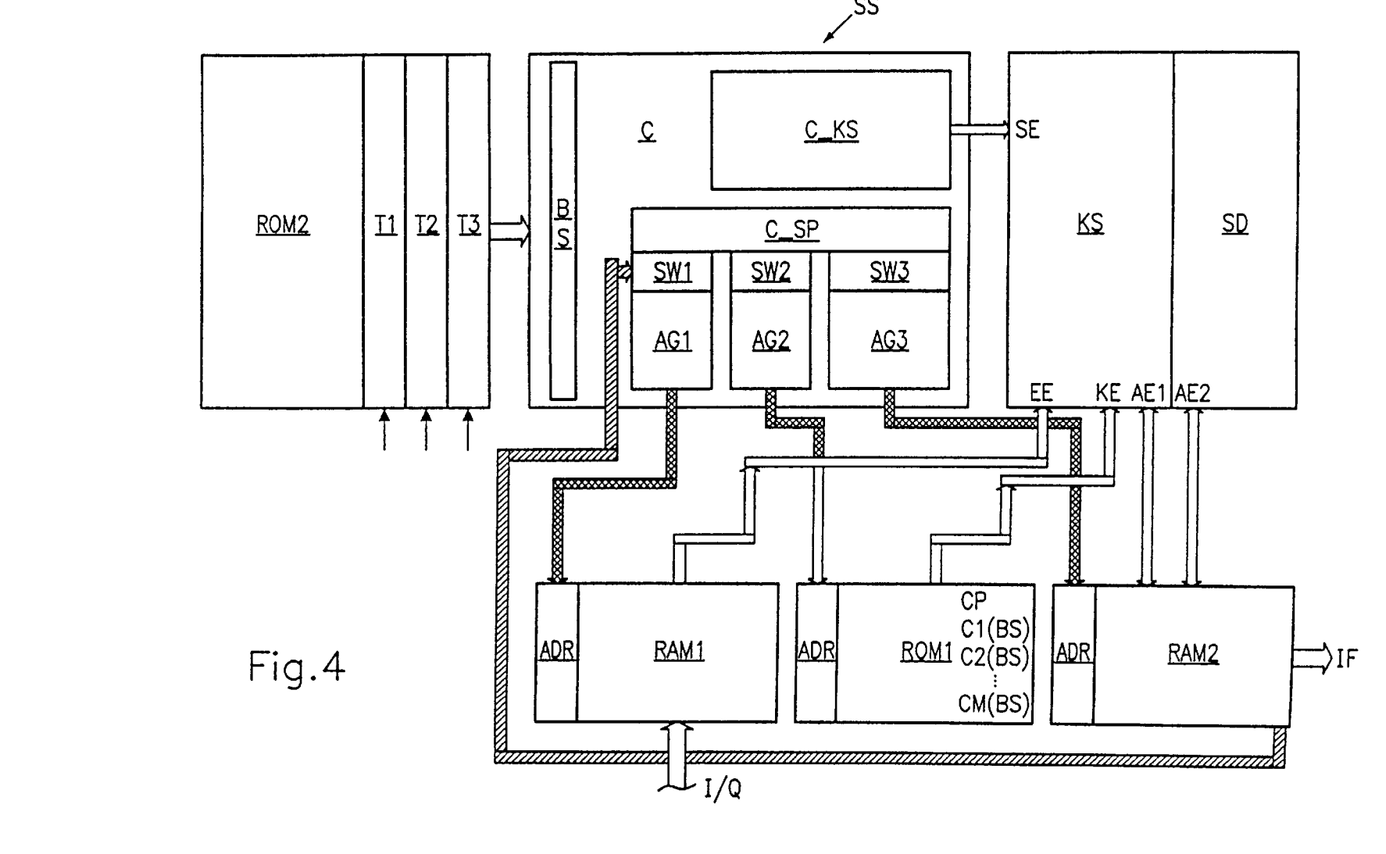
FIG. 4 is a schematic illustration showing a first embodiment of the hardware structure of a search circuit according to the invention.
Figure 5:
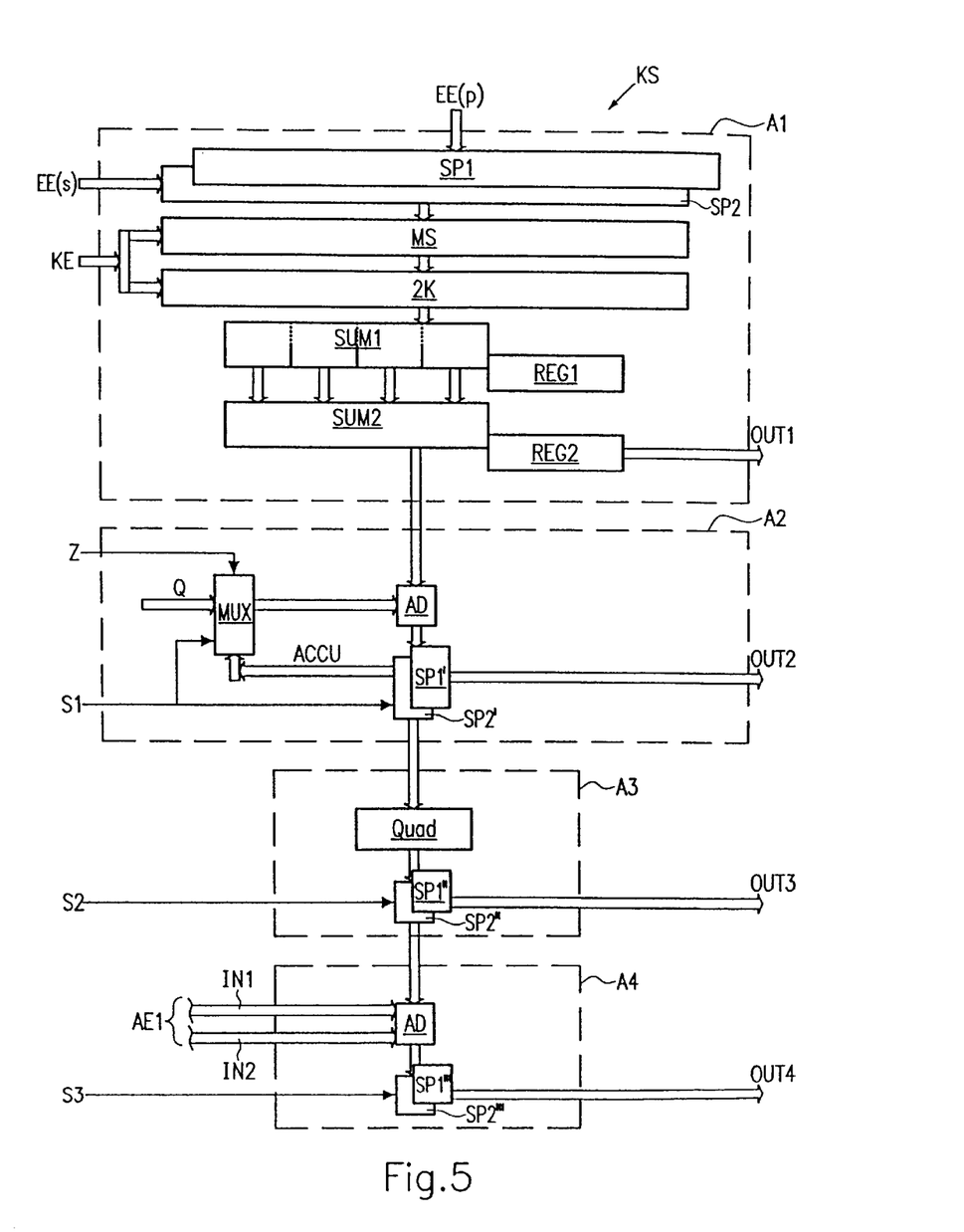
FIG. 5 is a block diagram showing the correlator circuit shown in FIG. 4.

FIG. 5 shows a block diagram of the correlator circuit KS from FIG. 4. A first section A1 of the correlator circuit KS has two memory banks SP1 and SP2, which are each formed from N memory locations with a word length of 16 bits. The two memory banks SP1, SP2 are connected to the input data memory RAM1, and are supplied with a sequence element of length N from the received data sequence either in parallel form (via EE(p)) or in serial form (via EE(s)) via a received data input EE.

A multiplier stage MS, including N multipliers in parallel, is disposed in the signal path downstream from the two memory banks SP1 and SP2. The multiplier stage MS alternately correlates the N-element sequence elements of the received data sequence that are stored in the memory banks SP1 and SP2 with sequence elements of one of the correlation data sequences cp, c1(BS), c2(BS), ..., cM(BS) that are stored in the correlation data memory ROM1. To do this, the multiplier stage MS is connected to the correlation data memory ROM1 via the correlation data input KE.

A stage for forming the two's complement 2K is located in the data path downstream from the multiplier stage MS.

This stage is likewise connected to the correlation data input KE.

To make the explanation of the invention simpler, the following text assumes that N=16.

The first section A1 also has a first summation data processing unit SUM1, which includes four adder units, and a second summation data processing unit SUM2, which forms the sum of the four outputs from the first summation data processing unit SUM1. The four outputs of the first summation data processing unit SUM1 and the output of the second summation data processing unit SUM2 are, furthermore, stored in register memories REG1 (4×16 bits) and REG2 (1×16 bits).

In the following text, the second register memory REG2 is also referred to as a sequence element correlation result memory, since the sum value that is stored in it is the correlation result OUT1 relating to an N-element sequence element of the received data sequence with a sequence element of the same length in the correlation data sequence. The stored sequence element correlation result OUT1 is signaled to the result data memory RAM2 via the output/input AE1.

An accumulator ACCU is accommodated in a second section A2 of the correlator circuit KS. The accumulator ACCU has an adder AD, two memories SP1', SP2' and a multiplexer MUX, which are configured in a loop.

The accumulator ACCU adds K sequence element correlation results. The number K depends on the length of the received data sequence or correlation data sequence on which it is based (that is to say the search procedure T1/T2/T3 being called at that time) and other influencing variables, such as the desired result accuracy.

The output of the accumulator ACCU can be set to the value zero via a reset signal Z. A control signal S1, which is received via the control data input SE from the correlator circuit controller C_KS, allows the memories SP1', SP2' to be activated/deactivated as a function of the number of accumulator additions at that time. After K runs, the memories SP1' and SP2' contain accumulated correlation results OUT2. Each accumulated correlation result in SP1' or SP2' is thus associated with K received sequence elements in the received data sequence, in the memory banks SP1 and SP2, respectively. The accumulated correlation result OUT2 is passed via the output/input AE1 to the result data memory RAM2.

The correlator circuit controller C_KS can set K to be equal to zero, depending on the control process. In this case, the accumulator ACCU is bypassed.

An optional third section A3 is disposed in the data path downstream from the second section A2. The third section A3 contains a 16-bit squaring device QUAD, which ensures that the accumulated correlation result that occurs downstream from the squaring devise QUAD bas a positive value. The squared accumulated correlation result OUT3 is stored in 16-bit memories SP1" and SP2", and is passed at the output/input AE1 to the result data memory RAM2.

The memories SP1", SP2" in the third section A3 likewise can be activated or deactivated separately via a control signal S2.

An optional fourth section A4 has an adder AD as well as further memories SP1''' and SP2'''. Earlier OUT3 correlation results can be read from the result data memory RAM2 via a first data line IN1 by using the adder AD, and can be added to the OUT3 correlation result at that time. Calculated correlation results from the complementary signal path (I branch or Q branch) can be added in an analogous manner via the second data line IN2.

The memories SP1''' and SP2''' can likewise be activated/deactivated separately via a control signal S3, which is emitted from the correlator circuit controller C_KS. The stored values are passed as OUT4 to the result data memory RAM2.

Depending on how the sections A2 to A4 are driven, an overall correlation result can be optionally produced in the form of the outputs OUT2; OUT3 or OUT4 from the correlator circuit KS. For example, a suitable output OUT2 or OUT3 or OUT4 can in each case be preset in order to emit the overall correlation result relating to the search procedures T1/T2/T3.

The overall correlation result is supplied to the peak value detector SD. If a specific threshold value is exceeded, the peak value detector SD determines that correlation exists between the received data sequence that has been called up sequence element by sequence element in the received data memory RAM1, and the correlation data sequence which has been called up sequence element by sequence element in the correlation data memory ROM1. The fact that such a correlation is found allows time slot and/or frame synchronization and the determination of a path delay time in accordance with the chosen search procedure T1/T2/T3.

Figure 6:
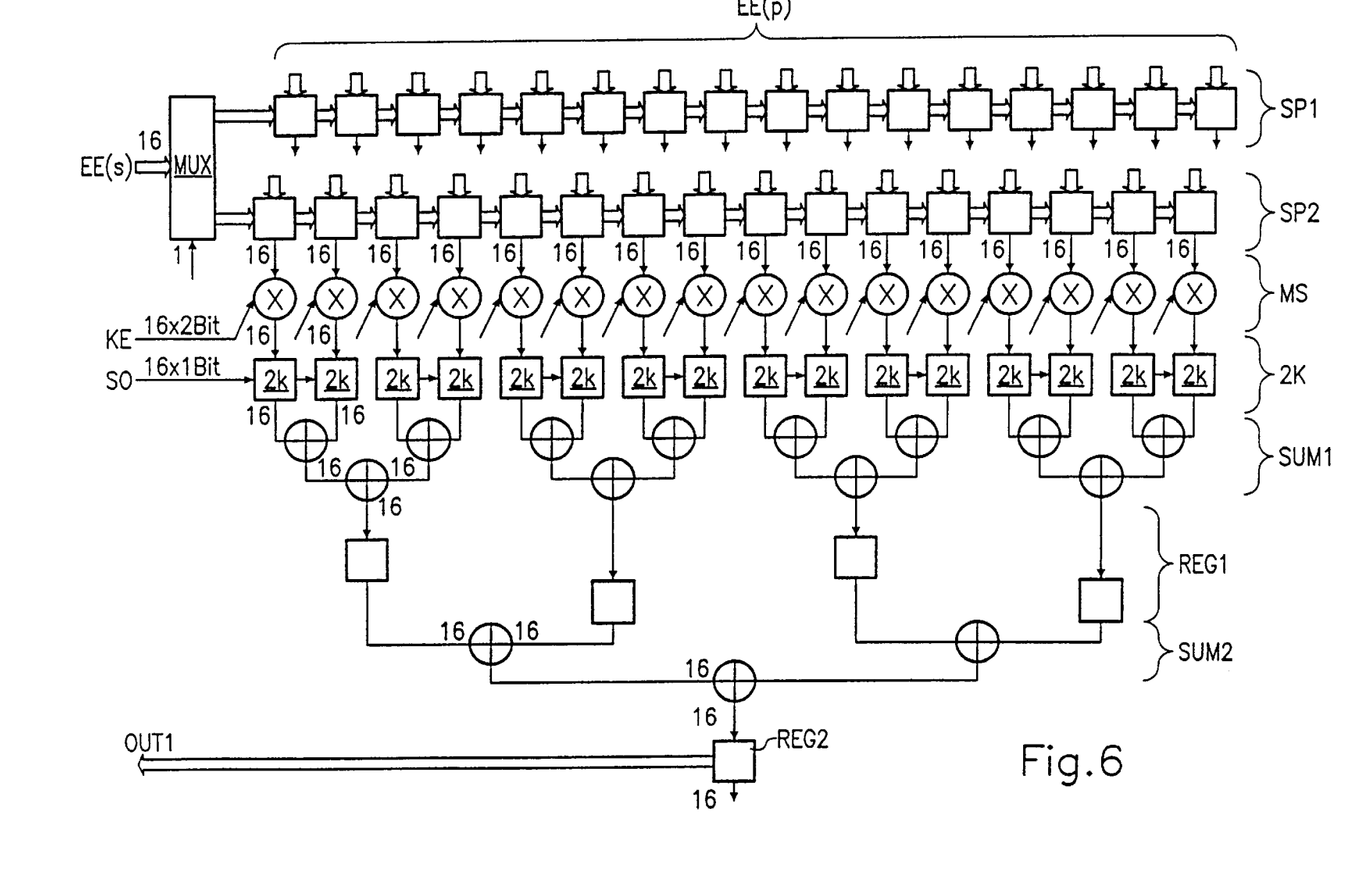
FIG. 6 is a enlarged, partial block diagram of the first section of the correlator circuit as shown in FIG. 5.

FIG. 6 shows the section A1 of the correlator circuit KS in detail, for the situation when N=16. The memory banks SP1 and SP2 accordingly each contain 16 memory locations. A multiplexer MUX is provided for driving the memory banks SP1 and SP2 in serial form via the input EE(s). With double oversampling (with respect to the chip rate $1/T_c$), the first memory bank SP1 is loaded, for example, with the early sample values, and the second memory bank is loaded with the late sample values, from a received data sequence. One 16-bit data word can be stored in each memory location.

Each of the 16 multipliers in the multiplier stage MS receives a 2-bit multiplier value via the correlation data input KE. The 16 multiplier values represent the sequence element in the digital correlation data sequence.

The 16 two's complement units 2k in the stage for forming the two's complement 2K can be activated and deactivated individually via control signals S0 from the correlation data input KE. The control signals S0 are normally a component of the sequence elements in the digital correlation data sequence.

Furthermore, as can be seen from FIG. 6, the summation data processing units SUM1 and SUM2 are each constructed in two stages.

The method of operation of the correlator circuit KS will be explained with reference to FIG. 7, and in conjunction with the preceding figures. It is assumed in this case that the time slot start search procedure T1 is intended to be carried out. Furthermore, a received data sequence with binary values is assumed, in order to simplify the explanation.

Figure 7:
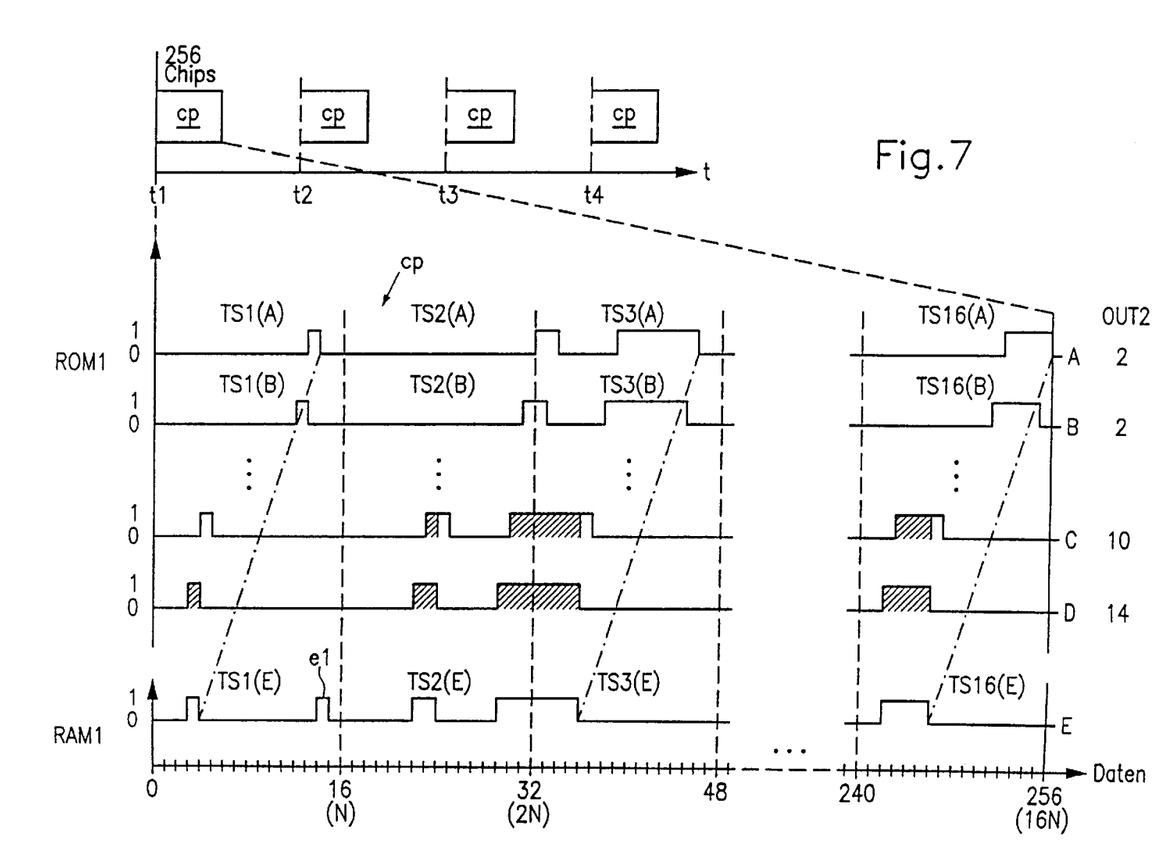
FIG. 7 is a schematic illustration showing a received data sequence and a correlation data sequence plotted against time, in order to explain the principle of operation of the device according to the invention.

As has already been mentioned in conjunction with FIG. 2b, the time slot synchronization is carried out based on the special digital correlation data sequence cp, which includes 256 chips (see the upper part of FIG. 7).

The 256 data values in the correlation data sequence cp (which is stored in the correlation data memory ROM1) are represented by the upper rectangular line A in the lower part of FIG. 7.

The rectangular line E represents the data values from the received data sequence that is stored in the received data memory RAM1 and has the same length. The dashed-dotted auxiliary lines indicate that the received data sequence is shifted by a specific number of data items (chips) with respect to the correlation data sequence. Further, detection errors can occur, see e1, by way of example.

When the time slot start search procedure T1 is selected in the command data memory ROM2, a first command word for the appropriate program routine is loaded into the command word memory BS in the control device C. A cycle counter in the memory controller C_SP is set to the value 1, and the start value setting devices SW1, SW2, SW3 are set to a start value. Using the addresses which are produced on the basis of the start values in the address generators AG1, AG2, a first sequence element TS1(A) in the correlation data sequence (rectangular line A) is supplied to the multiplier stage MS and to the two's complement stage 2K, and a first sequence element TS1(E) in the received data sequence (rectangular line E) is entered in the memory bank SP1 (the following text assumes that the received data sequence has only one sample value per chip, so that the memory bank SP2 is not required).

The correlation between two first sequence elements TS1(A) and TS1(E) results in the value OUT1=0.

In a next step, the sequence elements TS2(A) and TS2(E) are read from the memories ROM1 and RAM1, respectively, by the address generators AG1, AG2, and are correlated in the section A1 of the correlator circuit KS. This once again results in the value OUT1=0.

As a result of the matches between the first two data values in these sequence elements (see the shading), the correlation of the third sequence elements TS3(A) and TS3(E) results in the value OUT1=2.

The described sequence element correlation process is repeated until a number K, which can be predetermined, of sequence element correlations have been carried out. Generally, all the sequence elements are correlated with one another, that is to say K=16 in the described example.

The value OUT2=2 is obtained at the output of the second section A2 for the first three sequence elements, which are illustrated by way of example in FIG. 7, and for the sixteenth sequence element.

In a next step, the cycle counter for the correlator circuit controller C_KS is set to the value 2, and the start value setting device SW2 is set such that the sequence elements TS1(B), TS2(B), TS3(B), . . . , TS16(B) of the data sequence, which is shifted cyclically by one data value with respect to the correlation data sequence cp—represented by the rectangular line B—are subsequently correlated with the corresponding sequence TS1(E), TS2(E), TS3(E), . . . , TS16(E) from the received data sequence (E).

The value OUT2=2 is obtained for the sequence elements TS1(B) to TS3(B) and TS16(B) as illustrated in FIG. 7.

The data processing scheme described above is continued using the further correlation data sequences cp, which are each shifted cyclically by one data value. The rectangular line C shows the correlation data sequence cp, which is shifted by a single data value with respect to the received data sequence E. The accumulated correlation result is OUT2=10.

With the next cyclic shift of the correlation data sequence cp (rectangular line D), the rectangular lines E and D match except for the detection error e1. This results in OUT2=14, that is to say the accumulated correlation result is a maximum.

The maximum value of the accumulated correlation result OUT2 is identified by the peak value detector SD. The shift distance between the rectangular line D and the rectangular line A represents the information IF, which is required for time slot synchronization of the receiver.

A method that is equivalent to the cyclic shifting of the correlation data sequence cp includes the received data sequence being shifted with respect to the fixed correlation data sequence, that is to say of the start value setting device SW2 being kept constant, and the start value setting device SW1 being incremented.

It is clear from the description above that the correlator circuit KS can be used in a very flexible manner for widely different correlation tasks by virtue of its construction according to the invention and by virtue of the optional activation/deactivation of individual sections A2, A3, A4, with the method of operation of the correlator circuit KS being predetermined by the correlator circuit controller C_KS in the control device C as a function of the selected search procedure T1/T2/T3. The correlator circuit controller C_KS allows, in particular:

the selection of the reception branch (I or Q), the activation and deactivation of the first and second memory banks SP1, SP2 and of the memories SP1', SP2'; SP1", SP2"; SP1'", SP2'", the selection of the parallel or serial inputs EE(p) and EE (s), respectively, the selective bypassing of one or more of the sections A2, A3, and A4, the control of the data input via IN1 and/or IN2, and the activation/deactivation of the peak value detector SD.

We claim:

1. A correlation device for carrying out search procedures in a mobile radio receiver, comprising:

two sections for correlating a digital received data sequence including individual sequence elements of predetermined length N obtained from a received radio signal with a predetermined, digital correlation data sequence including sequence elements each having a respective length, a first of said two sections correlating the individual sequence elements of predetermined length N in the received data sequence with the individual sequence elements of the same length in the correlation data sequence during parallel data processing of each sequence, and producing a sequence element correlation result for each correlation, and a second of said two sections summing a variable number K of the sequence element correlation results to form an accumulated correlation result during serial data processing.

2. The device according to claim 1, wherein said first of said two sections includes P memory banks, each having N memory cells, where P is an integer at least equal to one.

3. The device according to claim 2, wherein:

P is at least equal to 2, and

P is an oversampling factor used to obtain the received data sequence from the received radio signal.

4. The device according to claim 1, wherein said first of said two sections includes a multiplier data processing stage having N multipliers connected in parallel.

5. The device according to claim 1, wherein said first of said two sections includes a two's complement data processing stage having N two's complement units connected in parallel.

6. The device according to claim 1, wherein said first of said two sections includes a multistage summation data processing unit for producing each sequence element correlation result.

7. The device according to claim 1, wherein said second of said two sections includes a control device for varying the number K of the sequence element correlation results being summed as a function of a search procedure to be carried out.

8. The device according to claim 1, wherein said second of said two sections includes a control device for varying the number K of the sequence element correlation results being summed as a function of the length of the digital received data sequence.

9. The device according to claim 1, wherein said second of said two sections includes a control device for varying the number K of the sequence element correlation results being summed as a function of a desired calculation accuracy with regard to the accumulated correlation result.

10. The device according to claim 1, wherein said second of said two sections includes a control device for varying the number K of the sequence element correlation results being summed according to a function selected from the group consisting of a search procedure to be carried out, the length of the digital received data sequence, and a desired calculation accuracy with regard to the accumulated correlation result.

11. The device according to claim 1, further comprising a third section disposed in a signal path downstream from said second section, said third section including a squaring device.

12. A system, comprising:

a first correlation device for carrying out search procedures in a mobile radio receiver, including two sections for correlating a digital received data sequence including individual sequence elements of predetermined length N obtained from a received radio signal with a predetermined, digital correlation data sequence including sequence elements each having a respective length, a first of said two sections correlating the individual sequence elements of predetermined length N in the received data sequence with the individual sequence elements of the same length in the correlation data sequence during parallel data processing of each sequence, and producing a sequence element correlation result for each correlation, and a second of said two sections summing a variable number K of the sequence element correlation results to form an accumulated correlation result during serial data processing;

a second correlation device for carrying out search procedures in said mobile radio receiver, including two sections for correlating the digital received data sequence including individual sequence elements of predetermined length N obtained from the received radio signal with the predetermined, digital correlation data sequence including sequence elements each having a respective length, a first of said two sections correlating the individual sequence elements of predetermined length N in the received data sequence with the individual sequence elements of the same length in the correlation data sequence during parallel data processing of each sequence, and producing a sequence element correlation result for each correlation, and a second of said two sections summing a variable number K of the sequence element correlation results to form an accumulated correlation result during serial data processing;

a common third section shared by said first and second correlation devices and in the form of an adder for adding the accumulated correlation results calculated in said second sections of said first and second devices.

13. The system according to claim 12, further comprising:

a fourth section disposed in a signal path of each device downstream from said respective second section and upstream from said common third section, said third section including a squaring device for squaring the accumulated correlation results;

said fourth section summing the squared accumulated correlation results from said third section.

* * * * *